United States Patent

[11] 3,578,742

| [72] | Inventor | William J. Manthei |
| | | Detroit, Mich. |
| [21] | Appl. No. | 802,993 |
| [22] | Filed | Feb. 27, 1969 |
| [45] | Patented | May 18, 1971 |
| [73] | Assignee | Kelsey-Hayes Company |

[54] THROW-AWAY TOOL INSERT
2 Claims, 3 Drawing Figs.

[52] U.S. Cl. ................................................ 29/96, 29/105
[51] Int. Cl. ..................................................... B26d 1/00, B26d 1/12
[50] Field of Search ........................................... 29/96, 97, 105, 105.1

[56] References Cited
UNITED STATES PATENTS

| 2,645,003 | 7/1953 | Thompson et al. | 29/105 |
| 2,664,617 | 1/1954 | Kralowetz | 29/105 |
| 2,893,110 | 7/1959 | Gibson et al. | 29/97 |
| 3,084,416 | 4/1963 | Broughton | 29/96 |
| 3,087,230 | 4/1963 | Comire | 29/96 |
| 3,200,474 | 8/1965 | Kralowetz | 29/105 |
| 3,466,721 | 9/1969 | Burns | 29/97 |

*Primary Examiner*—Harrison L. Hinson
*Attorney*—Harness, Dickey & Pierce

ABSTRACT: A machining tool for forming a surface and including a plurality of removable tool holders each of which holds one or more throwaway tool inserts. The tool holders are constructed so as to rigidly hold the tool inserts for precluding damage to the cutting edges of these inserts. In addition, the tool holders accurately locate the individual tool inserts.

INVENTOR.
William J. Manthei
BY Harness, Dickey & Pierce
ATTORNEYS

3,578,742

THROW-AWAY TOOL INSERT

BACKGROUND OF THE INVENTION

This invention relates to a tool holder and more particularly to an improved tool holder for holding and locating a throwaway tool insert. In many forms of machining operations, tool holders are provided for holding and locating cutting tools. It is an object of this invention to provide an improved tool holder for this purpose that accurately and firmly holds the tool insert and yet one which facilitates easy replacement of the tool inserts.

It is another object of this invention to provide a tool holder that supports the tool in such a way that its cutting edge cannot be easily broken.

It is a further object of this invention to provide a tool holder in which the locating surfaces may be conveniently and inexpensively machined.

SUMMARY OF THE INVENTION

A tool holder embodying this invention is particularly adapted for holding and locating throwaway tool inserts or the like. The tool holder comprises means defining a first accurately located surface that is adapted to engage and locate the tool insert in a first direction. Locating means engage and locate the tool insert in a direction normal to the first direction. Holding means having a second surface disposed substantially parallel to the first surface are provided for retaining the insert between the first and second surfaces. Locking means are provided for urging the first and second surfaces toward each other to positively hold the tool insert in the tool holder.

DETAILED DESCRIPTION OF THE PREFERRED EMBODIMENT

Figure 1:
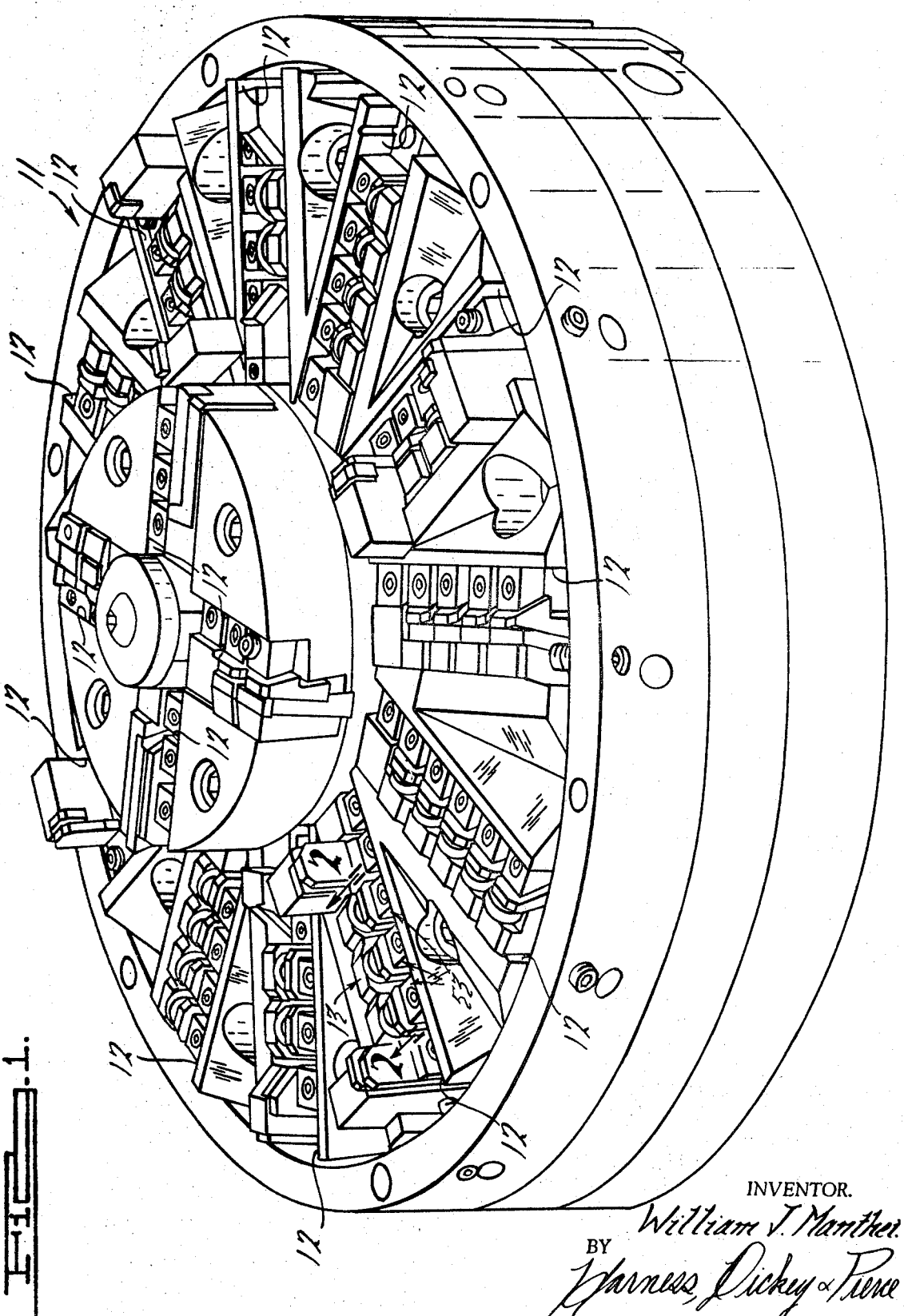
FIG. 1 is a perspective view of a cutting head for a machine tool incorporating a plurality of tool holders and inserts embodying the invention.
Figure 2:
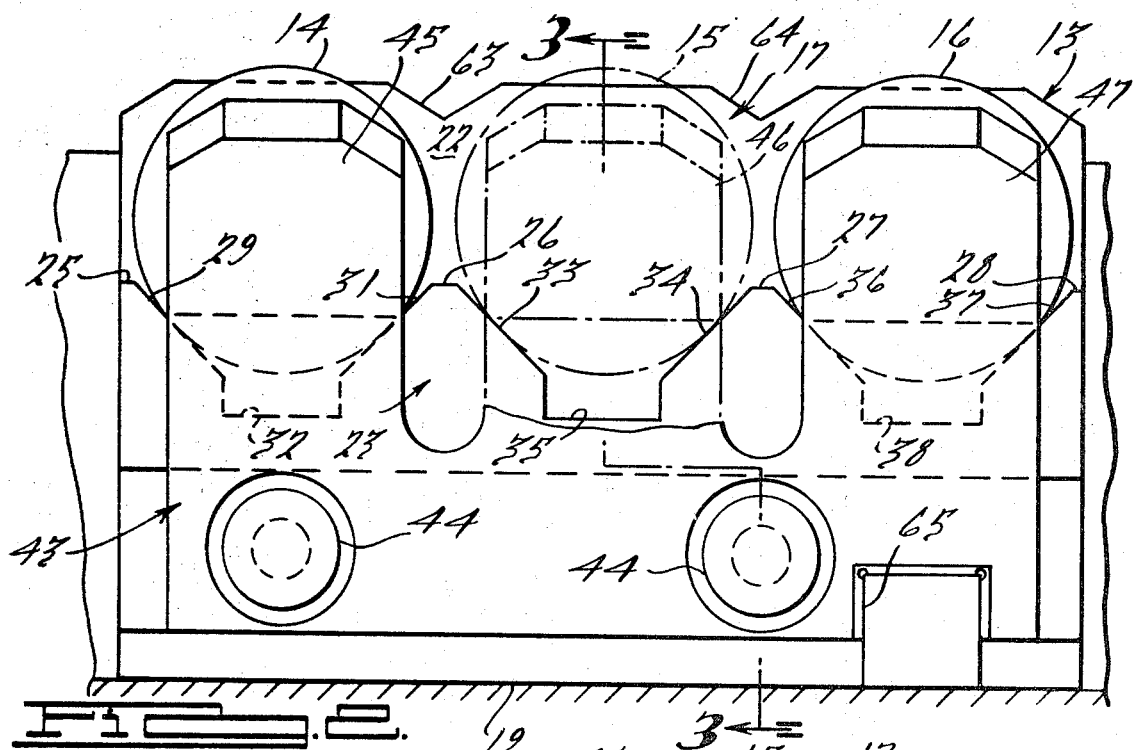
FIG. 2 is an enlarged elevational view with a portion broken away and in phantom showing one of the tool holders and associated inserts in its assembled position and is taken generally along the line 2–2 of FIG. 3.
Figure 3:
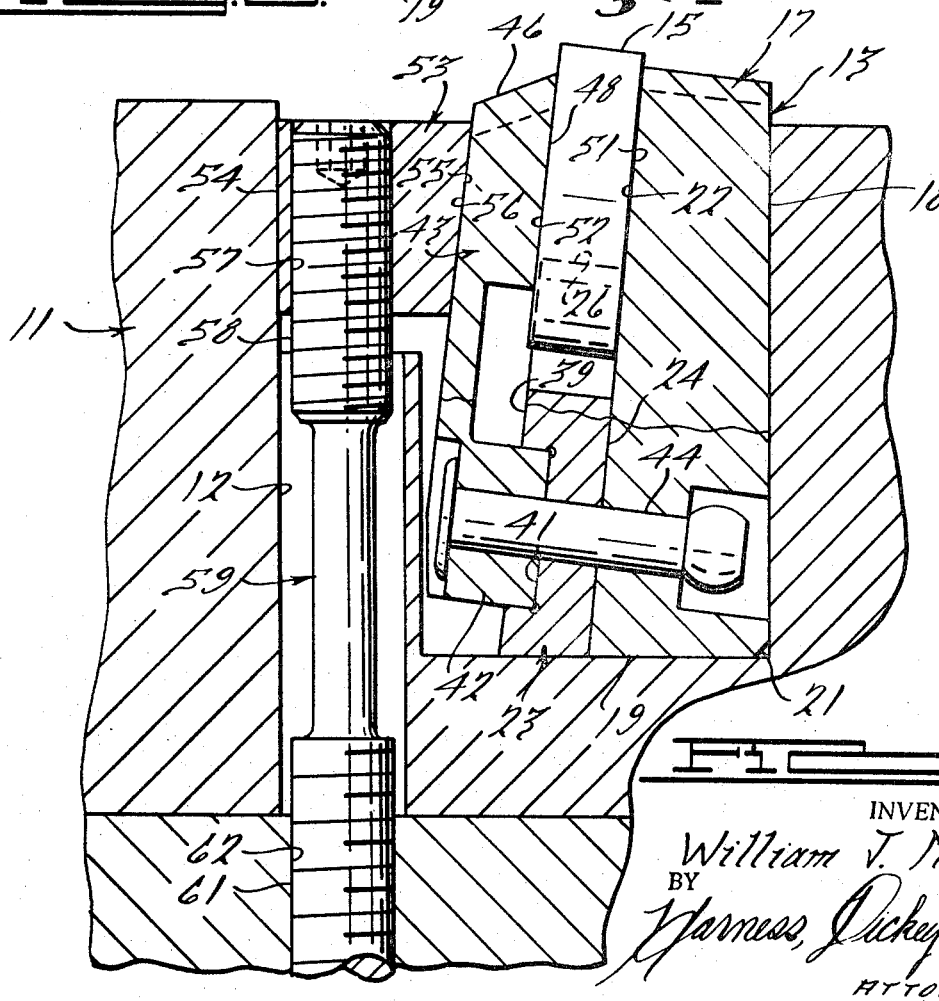
FIG. 3 is a cross-sectional view taken along the line 3–3 of FIG. 2.

Referring first to FIG. 1, a cutting head, commonly known as a cathead, embodying this invention is identified generally by the reference numeral 11. The cutting head 11 is adapted to machine surfaces such as disc brake rotors and is formed with a plurality of generally radially extending recesses 12 in which tool holders, to be described, are supported. Since the general construction of the cathead assembly 11 forms no part of this invention, it will not be described in further detail. The individual tool holders, which do comprise this invention, will now be described by particular reference to FIGS. 2 and 3.

Received in selected ones of the grooves 12 are tool holder assemblies, indicated generally by the reference numeral 13, each of which is adapted to hold a plurality of cutting tool inserts 14, 15 and 16. The tool holder assembly 13 is comprised of a first backing member 17 that has a rear surface 18 that is adapted to engage one side of the groove 12 and a bottom surface 19 that is adapted to engage the base of the groove 12. The surfaces 18 and 19 extend at substantially right angles to each other and a chamfer 21 is formed at the intersection of these surfaces to provide a clearance at the base of the groove 12. A tool-insert-engaging surface 22 extends upwardly from the surface 19 and is disposed at an angle to the surfaces 18 and 19. This angle defines the rake angle of the tool insert and in the described embodiment a 7° negative rake angle is provided. The surfaces 18, 19 and 22 are accurately ground or otherwise machined so as to provide the desired tool insert location, as will become more apparent as this description proceeds.

An intermediate tool-insert-locating member, indicated generally by the reference numeral 23, has an accurately formed surface 24 that abuttingly engages the tool-locating surface 22. The intermediate member 23 is provided with a plurality of upstanding teeth 25, 26, 27 and 28. The teeth 25 and 26 have converging angularly related locating surfaces 29 and 31 with a clearance recess 32 being formed at their intersection. In a like manner, the teeth 26 and 27 have angularly related locating surfaces 33 and 34 with a recess 35 formed at their intersection; and the teeth 27 and 28 have angularly related locating surfaces 36 and 37 with a recess 38 formed at their intersection. The locating surfaces 29, 31, 33, 34, 36 and 37 are accurately formed and extend perpendicularly to the locating surface 22 of the member 17. In the described embodiment, the surfaces 29, 31; 33, 34 and 36, 37 are formed at right angles with respect to each other.

The intermediate locating member 23 has a front face 39 in which a groove 41 is formed. A tongue 42 of a clamping member, indicated generally by the reference numeral 43, extends into and is located by the groove 41. A pair of rivets or other like fasteners 44 extend through aligned bores formed in the members 17, 23 and 43 for affixing these members together.

The clamping member 43 is formed with three upstanding clamping fingers 45, 46 and 47 that extend upwardly from the tongue 42 in a cantilevered fashion generally between the locating surfaces 29, 31; 33, 34 and 36, 37, respectively. Each of the clamping fingers 45, 46 and 47 has a rearwardly facing surface 48 that extends in a substantially parallel direction with respect to the locating surface 22 with a slight deviation, as will be noted.

The cutting tool inserts 14, 15 and 16 are accurately located with respect to the tool holder 13. Each of these inserts has a rear surface 51 that engages the locating surface 22 of the member 17. The inserts 14, 15 and 16 are generally cylindrical in configuration and their outer peripheries engage the respective locating surfaces 29, 31; 33, 34 and 36, 37. The forwardmost surface 52 of each of the inserts 14, 15 and 16 is spaced slightly from the clamping finger surfaces 48 before the tool holder 13 and associated cutting tools 14, 15 and 16 is inserted in the cathead assembly 11. That is, the surface 48 is normally spaced from the surface 52 at a slightly greater distance than the distance between the insert surfaces 51 and 52 so that the inserts 14, 15 and 16 may be freely inserted and removed.

When the tool holder 13 and associated tool inserts 14, 15 and 16 are placed into the groove 12, a locking structure is provided for rigidly holding the tool inserts 14, 15 and 16 in position. This locking device consists of a plurality of wedging members, only one of which appears in FIG. 3 and is identified generally by the reference numeral 53. One such wedging member is provided for each clamping finger 45, 46 and 47 of each tool holder 13. The wedging member 53 has a first surface 54 that engages the inner surface of the cathead recess 12 and a second, angularly related surface 55 that engages an outer surface 56 of the respective clamping finger 45, 46 and 47. The wedging member 53 is formed with a female threaded opening 57 in which a first threaded portion 58 of a differential socket-headed screw 59 is received. The differential screw 59 is formed with a second threaded portion 61 that enters into a tapped hole 62 formed in the cathead assembly 11 at the base of the recess 12. The pitches of the threaded portions 58 and 61 are slightly different from each other so that as the screw 59 is rotated, the wedging member 53 will be driven downwardly at a rate dependent upon the difference of these pitches. Hence, a greater force may be exerted by the wedging member 53 for a given turning force upon the differential screw 59. As the wedging member 53 is driven downwardly, it will exert a force against the respective clamping finger 45, 46 and 47 for rigidly locking the respective cutting tool insert 14, 15 and 16 in position.

It should be noted that the cutting tool inserts 14, 15 and 16 are supported in the tool holder 13 with only a small portion of their cutting edges exposed. This permits an extremely rigid holding of the tool inserts and guards against breakage of their cutting edges. The member 17 is notched, as at 63 and 64, between the tool inserts 14, 15 and 16 so as to provide clearance for chip passage. The respective tool holder 13 and their associated tool inserts 14, 15 and 16 are located radially in the grooves 12 in any suitable manner and, for this purpose, may be notched, as at 65, at their lower end to receive a locating dowel pin or key.

It should also be readily apparent that, since the tool holder 13 is made up of separate elements, accurate machining of the surfaces 22, 48 and 29; 31, 33, 34; and 36, 37 is possible.

I claim:

1. In combination: a cutting head or the like defining a recess adapted to receive a tool holder received in said recess; said tool holder comprising a first member having a first locating surface, a second member juxtaposed to said first locating surface of said first member, said second member having a second locating surface extending substantially perpendicularly to said first locating surface, a clamping member having a clamping finger portion and means for affixing said first member, said second member and said clamping member together with said clamping finger being supported in a cantilevered fashion, said clamping finger having a third surface facing said first locating surface and defining with said first surface and with second locating surface a tool-insert-receiving recess for receiving a tool insert, said first locating surface and said third locating surface being normally spaced apart a distance greater than the corresponding dimension of the received tool insert for free insertion and removal of the tool insert to and from said tool-insert-receiving recess; and clamping means carried by said cutting head and engageable with said clamping member for cantilevered deflection of said clamping member into gripping engagement with the received tool insert.

2. The combination as set forth in claim 1 wherein the clamping member has a plurality of clamping fingers each adapted to engage and hold a respective tool insert, there being one clamping means for each of said clamping fingers for cantilevered deflection of said clamping fingers.

UNITED STATES PATENT OFFICE
CERTIFICATE OF CORRECTION

Patent No. 3,578,742            Dated       May 18, 1971

Inventor(s) William J. Manthei

It is certified that error appears in the above-identified patent and that said Letters Patent are hereby corrected as shown below:

Column 3, line 14 (Claim 1, line 2)

After "holder" insert -- ; a tool holder --

Signed and sealed this 22nd day of February 1972.

(SEAL)
Attest:

EDWARD M. FLETCHER, JR.          ROBERT GOTTSCHALK
Attesting Officer                   Commissioner of Patents